(12) United States Patent
Mahrt et al.

(10) Patent No.: US 10,983,054 B2
(45) Date of Patent: Apr. 20, 2021

(54) OPTICAL SENSOR WITH LUMINESCENT QUANTUM NANOPROBES

(71) Applicant: INTERNATIONAL BUSINESS MACHINES CORPORATION, Armonk, NY (US)

(72) Inventors: Rainer F. Mahrt, Maennedorf (CH); Gabriele Raino, Zurich (CH); Thilo H. C. Stoeferle, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 334 days.

(21) Appl. No.: 15/983,402

(22) Filed: May 18, 2018

(65) Prior Publication Data

US 2018/0266953 A1    Sep. 20, 2018

Related U.S. Application Data

(62) Division of application No. 15/161,647, filed on May 23, 2016.

(51) Int. Cl.
*G01N 21/64* (2006.01)

(52) U.S. Cl.
CPC .......... *G01N 21/64* (2013.01); *G01N 21/6489* (2013.01)

(58) Field of Classification Search
CPC .......................... G01N 21/64; G01N 21/6489
See application file for complete search history.

(56) References Cited

U.S. PATENT DOCUMENTS

| 5,262,643 | A  | 11/1993 | Hammond et al.    |
| 5,731,587 | A  | 3/1998  | DiBattista et al. |
| 2013/0115713 | A1 | 5/2013  | Mountziaris et al. |
| 2015/0355040 | A1 | 12/2015 | Sirbuly et al.    |

(Continued)

FOREIGN PATENT DOCUMENTS

| CN | 104804722 A  | 7/2015 |
| KR | 20110027965 A | 3/2011 |

OTHER PUBLICATIONS

Zeon Corporation ZEP520A Technical Report, 12 pages (Year: 2003).*

(Continued)

*Primary Examiner* — David P Porta
*Assistant Examiner* — Shun Lee
(74) *Attorney, Agent, or Firm* — Cantor Colburn LLP; Daniel Morris (57) ABSTRACT

An optical sensor apparatus is disclosed. The apparatus comprises: a sample holder, configured to hold a sample, in operation; a probe, comprising an arrangement of luminescent quantum dots; an optical source, configured to optically excite the luminescent quantum dots; an optical detector, configured to read optical signals from the quantum dots; and a circuit. The circuit is connected to the optical detector and configured to determine correlations between optical signals read by the optical detector. The probe is positioned or positionable relatively to, e.g., at a distance from, the sample, such that optical signals transmitted by each of the quantum dots are influenced by the sample, in operation. The present invention is further directed to related methods of operation and fabrication methods.

18 Claims, 6 Drawing Sheets

(56) References Cited

U.S. PATENT DOCUMENTS

2017/0336325 A1 11/2017 Mahrt et al.
2018/0143222 A1 5/2018 Lee et al.

OTHER PUBLICATIONS

Garcia et al. Advanced scanning probe lithography, Nature Nanotechnology vol. 9, pp. 577-587 (Year: 2014).*

Xie et al. Nanoscale and single-dot patterning of colloidal quantum dots, Nano Letters vol. 15, No. 11, pp. 7481-7487 (Year: 2015).*

Ocean Nano Tech, LLC. AciaFTM Quantum Dots with Carboxylic Acxid Group, 5 pages, 2009.

List of IBM Patents or Patent Applications Treated as Related; (Appendix P), Filed May 18, 2018; pp. 1-2.

Biagioni, P. et al., "A simple method for producing flattened atomic force microscopy tips," Jan. 18, 2008, Review of Scientific Instruments, vol. 79, 016103; https://doi.org/10.1063/1.2834875.

Culbert et al., "Durable fiber optic mating surface with integrated lens," 2011 IEEE Avionics, Fiber-Optics and Photonics Technology Conference (Oct. 2011), pp. 99-100.

Felix, Holzner, et al.,"Directed Placement of Gold Nanorods Using a Removable Template for Guided Assembly", ACS Publications, NANO letters, Aug. 19, 2011, p. 1-6.

Jorge et al., "Optical Fiber Sensing Using Quantum Dots," Sensors, vol. 7, No. 12, Dec. 2007, pp. 3489-3534.

L.J. Wang, et al."A Graphene Quantum Dot with a Single Electron Transistor as Integrated Charge Sensor", American Institure of Physics, Dec. 29, 2010, p. 1-11.

M. Heiss, et al.,"Self-assembled quantum dots in a nanowire system for quantum photonics" Nature Materials, articles, Feb. 3, 2013, p. 1-6.

Mei, "Aphotoluminescence study of CdSxSe1-x—semiconductor quantum dots," Journal of Physics: Condensed Matter, vol. 4, No. 36, Sep. 1992, pp. 7521-7528.

Potyrailo, R., et al., "Multisize CdSe Nanocrystal/Polymer Nanocomposites for Selective Vapor Detection Identified from High-Throughput Screening Experimentation," Jan. 23, 2012, American Chemical Society, ACS Combinatorial Science, pp. 170-178.

Pugh-Thomas, D., et al., "CdSe (ZnS) nanocomposite luminescent high temperature sensor," 2011, Nanotechnology, vol. 22, pp. 1-7.

S. Kudera, et al.,"Selective Growth of PbSe on One or Both Tips of Colloidal Semiconductor Nanorods" American chemical Society,Nano Letters vol. 5, No. 3, Jan. 13, 2005, p. 1-5.

T. Plakhotnik, "Single-Molecule Dynamic Triangulation" Wiley Interscience, Articles, 2006, p. 1-6.

Tikhomirov, et al.,"DNA-based programming of quantum dot valency, self-assembly and luminescence", Nature nanotechnology, Letters, Jul. 20, 2011, p. 1-6.

V.R. Manfimato, et al.,"Controlled placement of colloidal quantum dots in sub-15 nm clusters", Nanotechnology IOP, vol. 24, Mar. 6, 2013, p. 1-7.

Vamivakas et al., "Nanoscale optical electrometer," Physical Review Letters, vol. 107, No. 16, Oct. 2011, 166802, 5 pages.

* cited by examiner

OPTICAL SENSOR WITH LUMINESCENT QUANTUM NANOPROBES

DOMESTIC PRIORITY

This application is a continuation/divisional of U.S. application Ser. No. 15/161,647, titled "OPTICAL SENSOR WITH LUMINESCENT QUANTUM NANOPROBES" filed May 23, 2016, the contents of which are incorporated by reference herein in its entirety.

BACKGROUND

The invention relates in general to the field of optical sensor apparatuses and, in particular, to the use of quantum dots as probes to sense a sample material.

Information about the surface of a sample can be obtained by several characterization methods, such as scanning probe microscopy (SPM) methods, like atomic force microscopy (AFM) or scanning tunneling microscopy (STM). However, probing the dynamics of buried charges in a working device remains elusive. Optical methods are known, which may overcome this limitation, but they suffer from poor spatial resolution associated with the diffraction limit of light.

An approach to track single charges at the nanoscale has been proposed wherein single molecules are used as nanoprobes to detect the trajectory of an elementary charge. Its sensing capabilities have been demonstrated theoretically and it has been shown that the determination of a single electron displacement can be obtained with sub-nanometer resolution. Its practical implementation, however, seems to have failed due to the difficulties to assemble single molecules accurately with nanometer resolution. The following references illustrate the background of this invention.

SUMMARY

According to a first aspect, the present invention is embodied as an optical sensor apparatus. The apparatus comprises: a sample holder, configured to hold a sample, in operation; a probe, comprising an arrangement of luminescent quantum dots; an optical source, configured to optically excite the luminescent quantum dots; an optical detector, configured to read optical signals from the quantum dots; and a circuit. The circuit is connected to the optical detector and configured to determine correlations between optical signals read by the optical detector. The probe is positioned or positionable relatively to the sample, such that optical signals transmitted by each of the quantum dots are influenced by the sample, in operation.

In embodiments, said quantum dots and said circuit are further configured to simultaneously sense electric, magnetic and temperature properties of the sample based on the correlations determined.

In particular, said circuit may further be configured to locate positions of electric charges in the sample based on the correlations determined.

According to another aspect, the invention is embodied as a method for optically probing a sample with a sensor apparatus such as described above. Basically, the method comprises: holding a sample in the sample holder; optically exciting the luminescent quantum dots with said optical source; reading, via said optical detector, optical signals from the quantum dots; and determining, with said circuit, correlations between the optical signals read by the optical detector.

According to still another aspect, the invention is embodied as a method of fabrication of an optical sensor probe. The fabrication method comprises: providing a bilayer structure comprising a substrate with a removable polymer thereon; structuring the removable polymer to obtain a template; depositing luminescent quantum dots onto the template; and removing the polymer to obtain quantum dots arranged on said substrate, according to said template, so as to form said probe.

Apparatuses and methods embodying the present invention will now be described, by way of non-limiting examples, and in reference to the accompanying drawings.

The accompanying drawings show simplified representations of apparatuses, probes or parts thereof, as involved in embodiments. Technical features depicted in the drawings are not to scale, for illustration purposes. Similar or functionally similar elements in the figures have been allocated the same numeral references, unless otherwise indicated.

DETAILED DESCRIPTION

In reference to FIGS. 1-4, an aspect of the invention is first described, which concerns optical sensor apparatuses 1, 1a.

Two classes of embodiments can notably be contemplated. In both cases, the apparatuses comprise the following, basic components: a sample holder 18; a probe 16, 16a; an optical source 11; an optical detector; and a circuit 40.

The sample holder 18 is configured to hold a sample 20, in operation, as in known characterization apparatuses. The probe 16, 16a comprises an arrangement of luminescent quantum dots 31-33, i.e., quantum dots capable of exhibiting luminescence. The quantum dots can be designed and arranged so as to functionalize the scanning tip. The luminescent quantum dots 31-33 may be nano-assembled due to fabrication methods discussed later, in reference to another aspect of the invention. Such methods ensure a correct placement of the quantum dots and therefore enable working optical sensor apparatuses as described herein.

In the first class of embodiments (FIGS. 1-3), the probe (which contains the quantum dots) is independent from and
} can be moved with respect to the sample 20. That is, the probe is here implemented as a scanning probe, as in known characterization apparatuses. In the second class of embodiments (FIG. 4), the quantum dots are directly provided on a surface of the sample 20.

In all cases, the optical source 11 is configured to optically excite the luminescent quantum dots 31-33. The optical detector 12 is configured to read optical signals $S_6$ from the quantum dots 31-33, i.e., photoluminescence caused by optical excitation $S_1$ by the optical source 11. The optical detector 12 may for instance comprise (or be connected to) a spectrograph, or a light intensity detector with good time resolution (nanoseconds or better), e.g., an avalanche photo diode or a photo multiplier. The detector may also comprise a charge coupled device (CCD) camera, as well as filters, etc.

The circuit 40, e.g., a computerized device, is connected to the optical detector 12 and configured to determine correlations between optical signals read by the optical detector 12, so as to derive information about the sample 20. The correlations can be performed similarly as in reference [1] cited earlier.

The probe 16 is positioned (FIG. 4) or positionable (FIGS. 1-3) relatively to the sample 20, such that optical signals from each of the quantum dots 31-33 are influenced by the sample 20, in operation. E.g., the luminescent quantum dots 31-33 may, each, be positioned or positionable at "coulombic" distances from the sample 20, e.g., at a distance less than 100 nm from the top surface of the sample 20, in operation. This way, optical signals $S_4$-$S_6$ from the luminescent quantum dots 31-33 (occurring in response to optical excitation by the optical source 11) remain influenced by electric charges and, in particular, by charge dynamics in the sample 20, as discussed later in detail.

Figure 1:
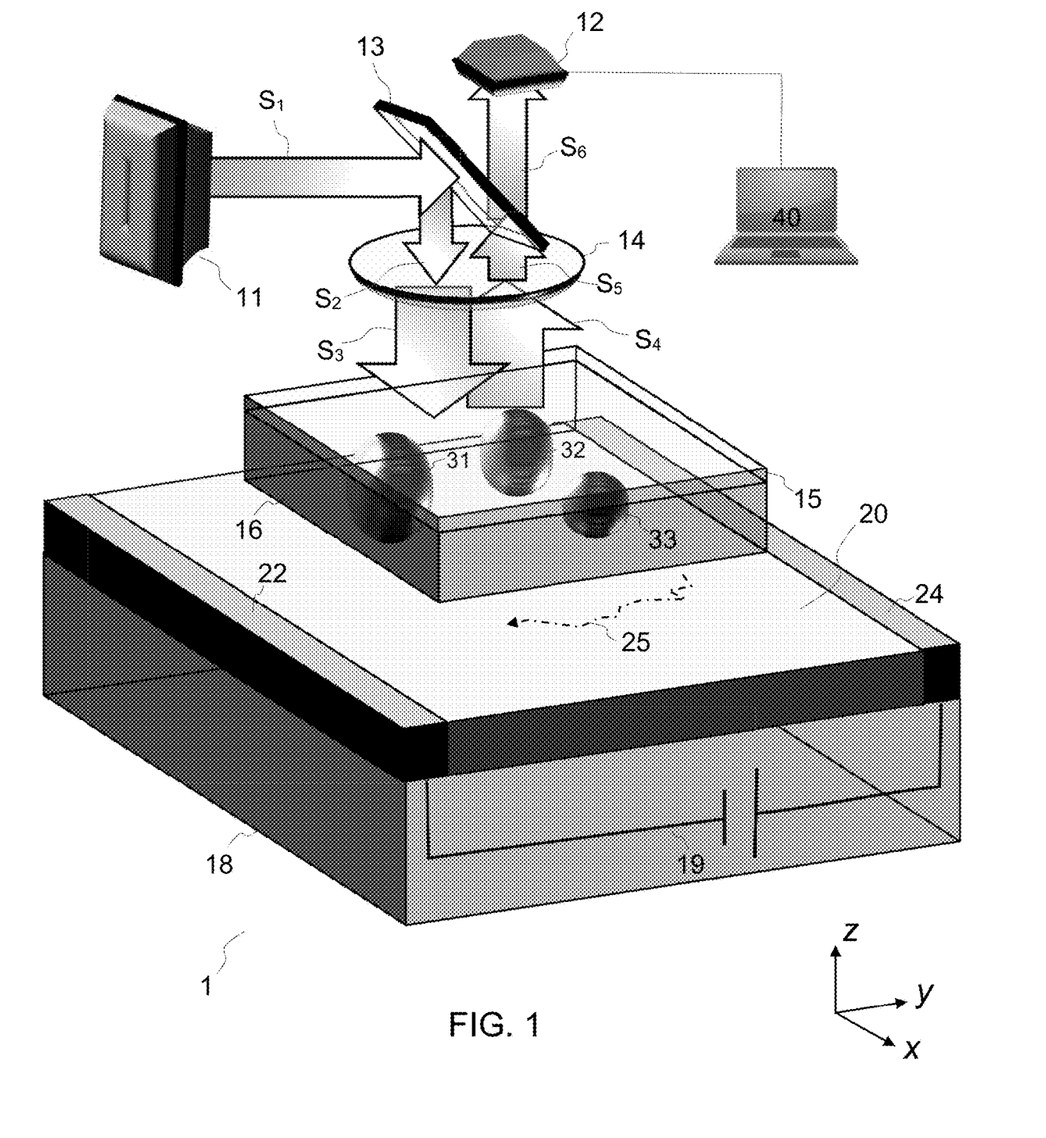
FIG. 1 is a 3D view of an optical sensor apparatus, according to one or more embodiments.
Figure 4:
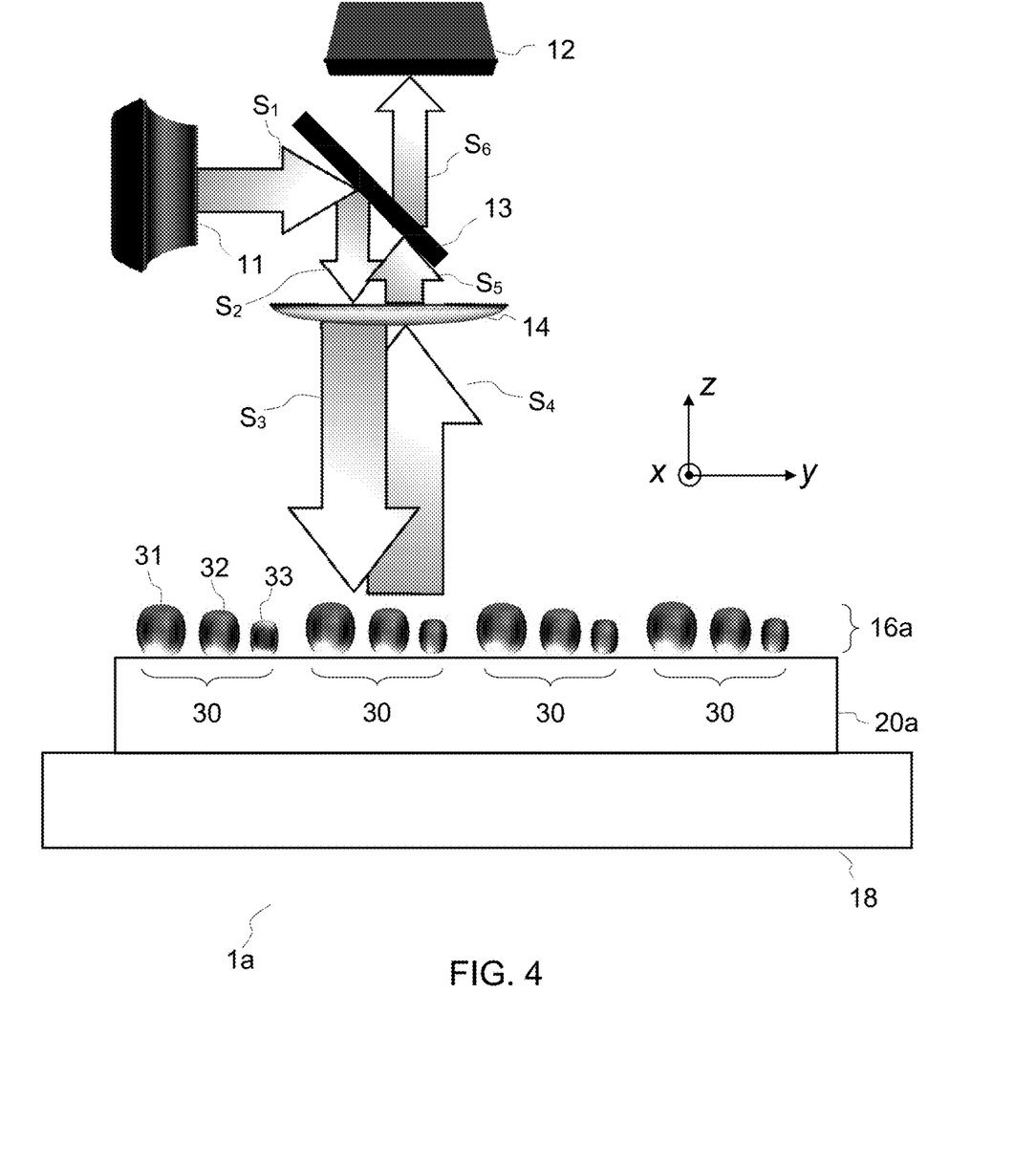
FIG. 4 is a 2D view of an optical sensor apparatus, according to one or more embodiments.

As depicted in FIGS. 1 and 4, a suitable, spatial configuration of the optical source 11 and the detector may be achieved using mirrors 13, lenses 14, beam splitters, etc., to appropriately direct optical signals initially transmitted from the optical source 11 to the probe 16 and, conversely, optical signals transmitted from the probe 16 to the optical detector 12, as known per se. Additional mirrors and lenses may be involved (not shown). If transparent samples are used, it is also possible to achieve the optical excitation and detection through the sample (from below) instead of the same side where the probe is.

Figure 2:
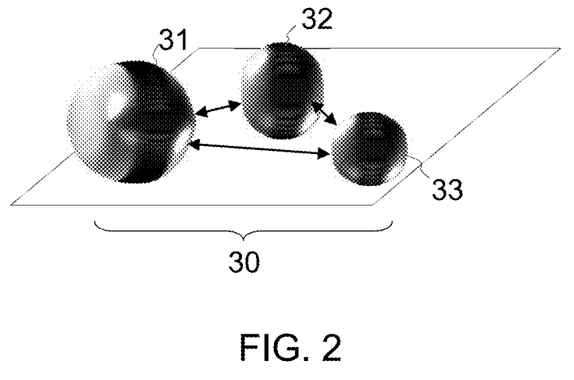
FIG. 2 is a 3D view of a planar arrangement of quantum dots, as involved in an apparatus such as depicted in FIG. 1.
Figure 3:
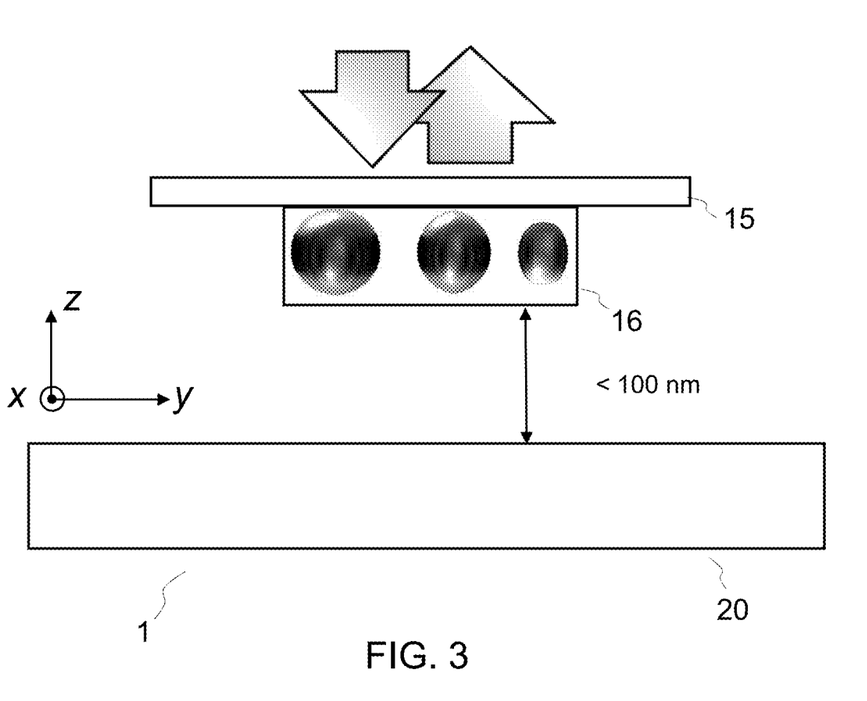
FIG. 3 is a 2D view of the optical sensor apparatus of FIG. 1.

In the examples of FIGS. 1-3, an optical signal $S_1$ is first transmitted from the source 11, redirected downwardly $S_2$ via a mirror 13 towards a lens 14, which converges light $S_3$ towards the luminescent quantum dots, as needed (this depends on the area spanned by the arrangement 31-33 with respect to the incident optical beam), to excite them. The signals $S_4$ occurring in response to the initial excitation are collimated $S_5$ and redirected $S_6$ towards the detector 12. The detector 12 is placed above the mirror 13, such that light that reaches the detector 12 first passes through the mirror 13, while the excitation light is reflected by the mirror 13. This can be achieved with a dichroic mirror, i.e. reflecting the excitation light wavelength but being transmissive to the light emitted from the quantum dots (which has a slightly different wavelength than the excitation light). In variants, the mirror 13 may be polarization sensitive, i.e., it may be reflective for the polarization of the excitation light (from a polarized source) but transmissive for the light from the quantum dots (which typically is unpolarized or could have a different polarization than the excitation light).

In this respect, the invention can equally be embodied as a method for optically probing a sample 20 with a sensor apparatus 1, 1a such as described above. Basically, such a method relies on optically exciting $S_1$-$S_3$ the luminescent quantum dots 31-33 due to said optical source 11. Optical signals from the quantum dots 31-33 can be concomitantly read via the optical detector 12. As per the configuration of the apparatus 1, 1a, signals by the quantum dots are influenced by the sample 20 held in the sample holder 18. Finally, correlations between optical signals read by the optical detector 12 are determined, due to the circuit 40, in order to determine, in turn, properties from the target sample 20.

The quantum dots 31-33 can be assembled using known, lithographic methods, with the required accuracy. Example of such methods are described in references [2, 3] cited in the background section. Controlled arrangements of quantum dots as involved herein can be used as local probes for high-resolution nanoscale mapping.

Using multiple probes allows higher degree of correlations with improved sensing capabilities. In particular, said quantum dots 31-33 and said circuit 40 may be configured, in embodiments, to simultaneously sense electric, magnetic and temperature properties (e.g., temperature fluctuations) of the sample 20, based on correlations as determined by the circuit 40. Such properties may be sensed at the molecular length scale with the present approaches.

As illustrated in FIG. 1, the circuit 40 may, in particular, be configured to locate and therefore track positions 25 of electric charges in the sample 20 (possibly in three-dimension in the sample), based on the correlations determined between the detected signals $S_6$.

Charge dynamics can for instance be tracked as follows. Based on the spectral energy shift (ΔE) experienced by the quantum dot luminescence, we can calculate back the position r of the charge that generates that shift. ΔE and r are related by the approximate formula:

$$r = \sqrt[4]{\frac{\alpha e^2}{(4\pi\varepsilon_r^e\epsilon_0)^2 \Delta E}\left(\frac{3}{2+\varepsilon_r^{core}/\varepsilon_r^e}\right)^2},$$

where α is the quantum dot polarizability, $\varepsilon_r^e$ is the dielectric constant of the environment, and $\varepsilon_r^{core}$ is the dielectric constant of the quantum dot material (core). By analyzing/correlating the response of different quantum dots we can now locate the charge in 3 dimensions. I.e., through correlation we can find a location r for the single charge that satisfies the energy shifts experienced by the different quantum dots in a given time interval, which amounts to perform triangulation to obtain the charge position.

The sample 20 (or the sample holder 18) may notably comprise electrodes 22, 24 and an electrical circuit 19 connected to the electrodes, to apply a voltage to the sample 20 and thus put electric charges 25 therein in motion, and also charge or deplete the sample.

In the example of FIG. 1 (first class of embodiments), the probe 16 and the sample holder 18 are mounted movable with respect to each other in the apparatus 1, such that the probe 16 can be moved with respect to the sample 20 to scan the latter, when the sample 20 is held in the sample holder 18, in operation. In this case, the probe 16 is independent from the sample 20 (in contrast with the embodiment of FIG. 4) holder 18. Typically, either the probe 16 is moved (x/y) above the sample 20 under test (which may require to move/re-orientate intermediate optical components 13, 14 as well) or the sample 20 is moved (x/y), due to a moveable holder 18 below the probe 16.

The probe 16 may for instance be mounted on a movable stage 15, as known in characterization apparatuses. The stage may notably be moved along direction z, to allow accurate placement of the probe 16 above the target sample 20. As illustrated in FIG. 3, the apparatus 1 may be designed so as to allow the probe 16 to be positioned at a distance less than 100 nm from the sample 20, for it to be sensitive to Coulomb forces exerted from charges inside the sample. The stage 15 may otherwise allow (x, y) scanning above the surface, at a constant height above the surface of the sample 20, to selectively probe regions of the sample 20. A feedback loop circuit may be used, to maintain a constant height.

Referring now more specifically to FIG. 2, the present optical sensor apparatuses 1, 1a shall can involve one or more arrangements 30 of quantum dots 31-33. Only one such arrangement is necessary when using a scanning probe 16 as in FIGS. 1-3. On the contrary, several subsets 30 of quantum dots need be involved, when using the approach of FIG. 4. In all cases, each arrangement 30 may comprise two or at least three quantum dots 31-33. The more quantum dots, the more sensing capabilities. The quantum dots may be essentially arranged in a plane, as illustrated in FIG. 2, owing to disclosed fabrication methods, discussed later in reference to FIGS. 7-10.

Luminescent quantum dots may in general be composed of II-VI and/or III-V elements. Owing to the quantum confinement of charge carriers in reduced spaces, quantum dots exhibit optical properties that are most suited for the present purpose, which properties include broad absorption spectra, sharp and symmetrical emission spectra, high quantum yields, good photo-stability and size dependent emission wavelength tenability, amongst others.

The optoelectronic properties of quantum dots (such as band gap) can be tuned as a function of their size and shape, for a given composition. In particular, the photoluminescence of a quantum dot can be tuned to specific wavelengths by controlling particle diameter. In general, larger particles (e.g., having radii of 5-6 nm) emit longer wavelengths resulting in orange-red emissions, whereas smaller particles (e.g., having radii of 2-3 nm) emit shorter wavelengths (blue and green). Still, the specific colors vs. sizes vary depending on their composition.

Of interest too is the optical fine structure which can be tuned through size, shape, composition and/or a shell around the quantum dots. The spectral fine structure can then be used to probe magnetic fields as the different emission lines of the fine structure shift differently within a given local magnetic field. It is furthermore possible to measure the temperature by probing the intensity ratio between the fine, structure emission lines (linked to the temperature by the Boltzmann factor $e^{-\Delta E/k_B T}$, where $\Delta E$ is the fine structure splitting energy, $k_B$ the Boltzmann constant and T the temperature.

Thus, the quantum dots 31-33 may, within a same arrangement or subset 30, substantially differ in size and/or in chemical composition, so as to sense distinct properties. They may solely differ in terms of chemical composition, or solely in terms of dimensions, or both. Each of said quantum dots 31-33 may for instance comprise one or more of the following elements: Cd, S and Se. The quantum dots may be binary (e.g., CdSe, CdS) or ternary compounds (e.g., $CdS_xSe_{1-x}$, $x \in [0, 1]$). When the quantum dots of a same subset 30 (such as depicted in FIG. 2) differ all in composition, in addition to possibly differ in size, a first quantum dot 31 may for instance comprise CdSe, a second one 32 may comprise CdS and a third one 33 may comprise $CdS_xSe_{1-x}$. The quantum dots may be chosen such that their emission spectra are compatible with common, inexpensive detectors.

In one or more embodiments, each of said quantum dots 31-33 has a maximal dimension that is less than 6 nm, consistently with the above remarks as to the emission spectra. More generally though, and depending on their exact composition, the quantum dots 31-33 may have maximal dimensions that are less than 15 nm. A minimal distance between any two of said quantum dots 31-33 may be between 1 and 50 nm, so as to avoid undesired interferences. Such minimal distances prevent undesired energy transfer from smaller quantum dots towards bigger ones. This may else affects the quantum yield of small quantum dots and deteriorate the performance of clustered quantum dots. In addition, minimal separation distances provide a baseline for the triangulation, else the determination of the charge position in three dimensions would not be possible. Best results are obtained for minimal distances that are between 6 and 15 nm, for example 10 nm.

In optical sensor apparatuses 1a according to the second class of embodiments (FIG. 4), the probe 16a is formed on a surface of the sample 20. I.e., the quantum dots are arranged directly on the sample's top surface and can be excited by the source 11, following the same principle as in FIG. 1. This approach makes sure that the probe 16 remains positioned at a minimal, constant distance from the sample 20, i.e., well below the threshold value of 100 nm, beyond which Coulomb forces do not measurably impact the photoluminescence of the quantum dots anymore.

In that case, the sample holder 18, the optical source 11 and the optical detector 12 are typically configured so as for the sample holder 18 to be movable with respect to each of the optical source 11 and the detector 12 (or intermediate optical components 13, 14, depending on the setup chosen). Typically, either the optical excitation/readout mechanism 11-14 is moved (x/y) over the sample 20 under test or the sample 20 is moved. In the second class of embodiments, the probe is not a scanning probe anymore, inasmuch as it is fixed with respect to the sample. However, the quantum dots can still be selectively excited, to probe a local portion of the top surface of the sample 20.

The optical sensor apparatus 1a may comprise several subsets 30 of arrangements of quantum dots, wherein each of the several subsets comprises, e.g., at least three quantum dots 31-33, as depicted in FIGS. 2 and 4. Said subsets may for instance form a periodic pattern, so as to form repeated subsets of quantum dots 31-33, which subsets span a bi-dimensional area of the sample 20 to allow local, selective optical excitations, as assumed in the embodiment of FIG. 4.

While the composition of the quantum dots may differ in a same subset, quantum dots of the same types may be used from one subset to the other. In variants, one may use different quantum dot sizes for each of the subsets. This allows, in turn, a large area of the sample to be probed simultaneously, using a large excitation beam and a spectrograph detector that is able to disperse all the emitted lines. In addition, using different quantum dot sizes in each subset makes it possible to address a single local subset. Indeed, when the spacing in the periodic pattern is below the diffraction limit of the excitation beam (typically a few hundred nanometers), then the different quantum dot sizes allow one subset at a time to be measured. Since the maximum sensing distance is below 100 nm, one likely would have a closely spaced periodic pattern (e.g., with a 50 nm period) in order to seamlessly cover the whole area.

At present, the charge sensing mechanism is explained in more details. Quantum dots are tiny semiconductor nanoparticles (e.g., CdSe) and their optical properties are strongly related to the nanoscale environment around them. As it can be realized, the quantum dots may accordingly act as local probes for electromagnetic fields and temperature on the nanometer scale. Because of the Coulomb interaction between a charge in the sample 20 and an exciton (electron-hole pair) in the quantum dot, the photoluminescence of this quantum dot happens to be red-shifted (dashed line signal in FIG. 5) compared with the non-interacting case (unperturbed photoluminescence, plain line signal in FIG. 5). The 2D plot, FIG. 6, shows the temporal behavior of the photoluminescence of a single quantum dot. In FIG. 6, consecutive photoluminescence spectra (acquired every 2 seconds) were aggregated for a CdSe/CdS core/shell quantum dot placed on a Si wafer having a 2 μm thermal oxide on top, whose charges were actually sensed, at 5 Kelvin.

Clear discrete spectral jumps are observed and associated to the presence of an external charge in close vicinity of the quantum dot surface. The different energy shifts measured for the quantum dot luminescence spectrum reveal the position of charge and its temporal dynamics. By using equation (1) above, the position of the charge that induces shift in the quantum dot luminescence spectrum can be monitored as a function of time.

Figure 5:
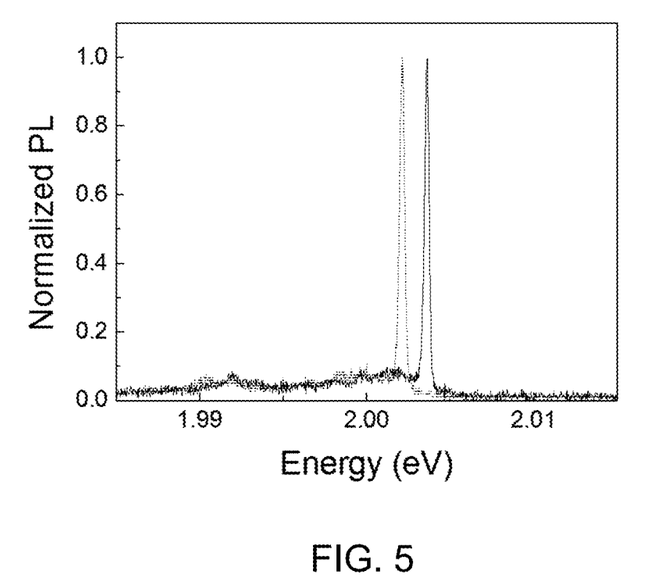
FIG. 5 is a plot representing the photoluminescence shift caused by Coulomb interactions between an external charge in a probed sample and an exciton (thus forming an electron-hole pair) in a quantum dot, as relied on in embodiments.
Figure 6:
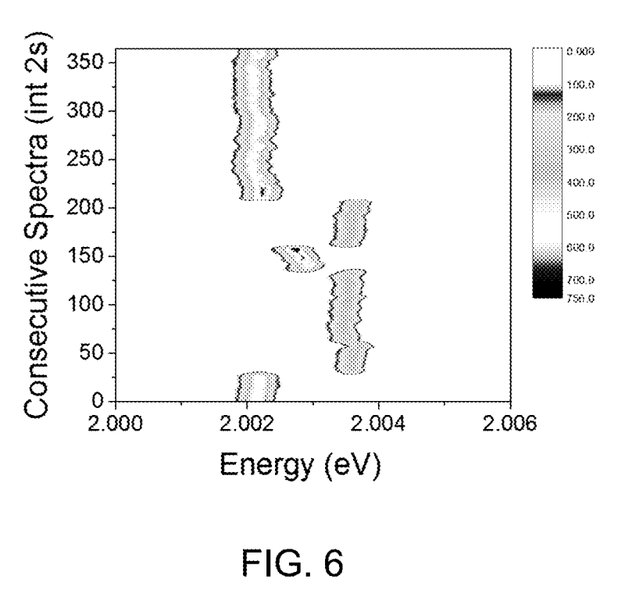
FIG. 6 is a 2D plot showing the temporal behavior of photoluminescence of a quantum dot, which reflects the charge dynamics over time, as involved in embodiments.

In addition, the emission of relatively small quantum dots is characterized by a double in the spectrum, i.e., the so called the dark-bright manifold (not visible in FIG. 5). The relative population of these two states follows the Boltzmann statistics and can be used to measure the temperature of the quantum dot in the low-temperature regime (e.g., less than 50K). Variations in the dark-bright splitting energy can be used as a measure of magnetic-field fluctuations in the close vicinity of the quantum dot. Thus, one understands that electric, magnetic and temperature-related properties can be simultaneously sensed, thereby enabling a multi-parameter metrology with nanoscale resolution.

Figure 7:
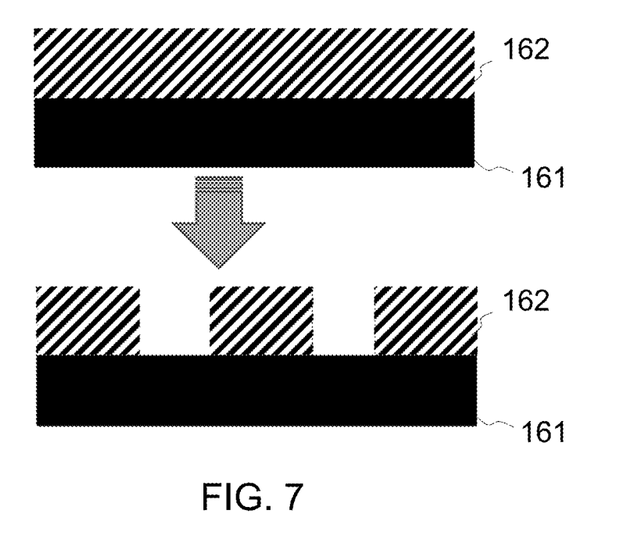
FIG. 7 illustrates a high-level fabrication operation of an optical probe according to one or more embodiments.
Figure 8:
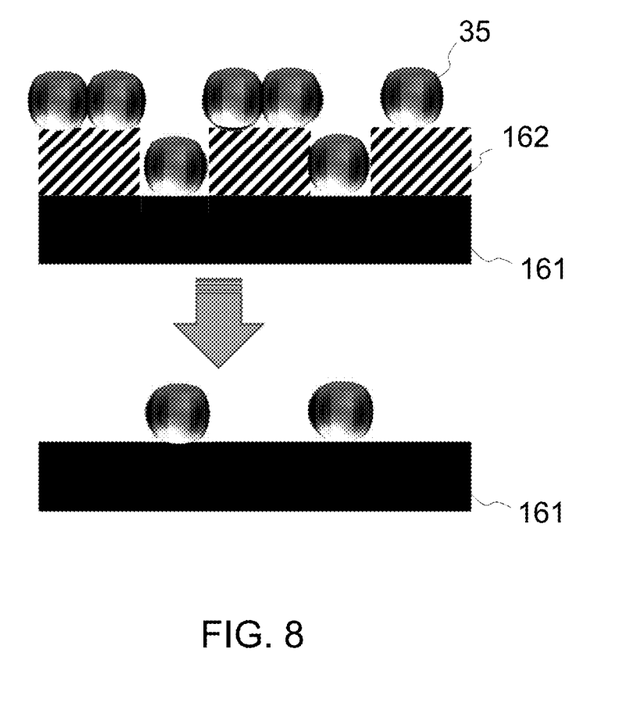
FIG. 8 illustrates a high-level fabrication operation of an optical probe according to one or more embodiments.
Figure 9:
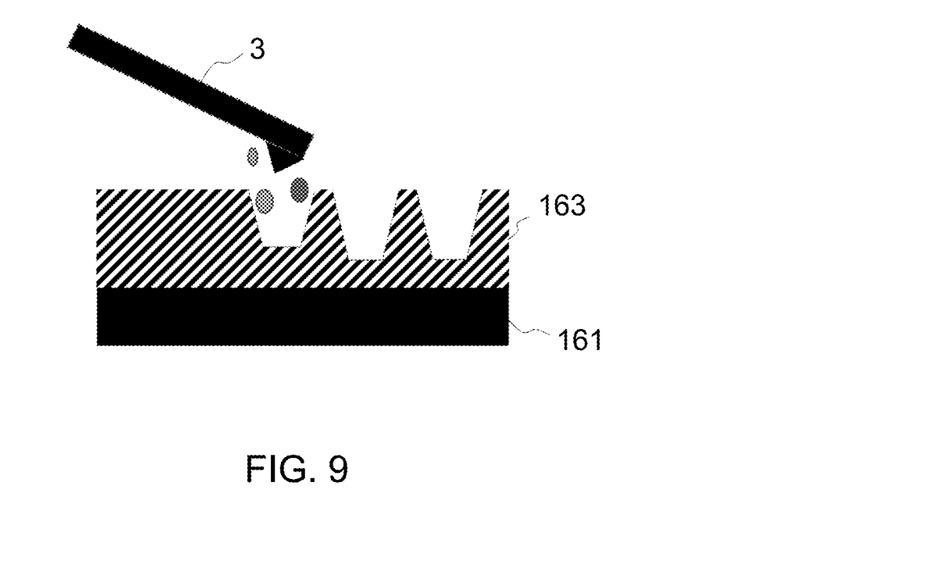
FIG. 9 illustrate a high-level fabrication operation of an optical probe according to one or more embodiments.
Figure 10:
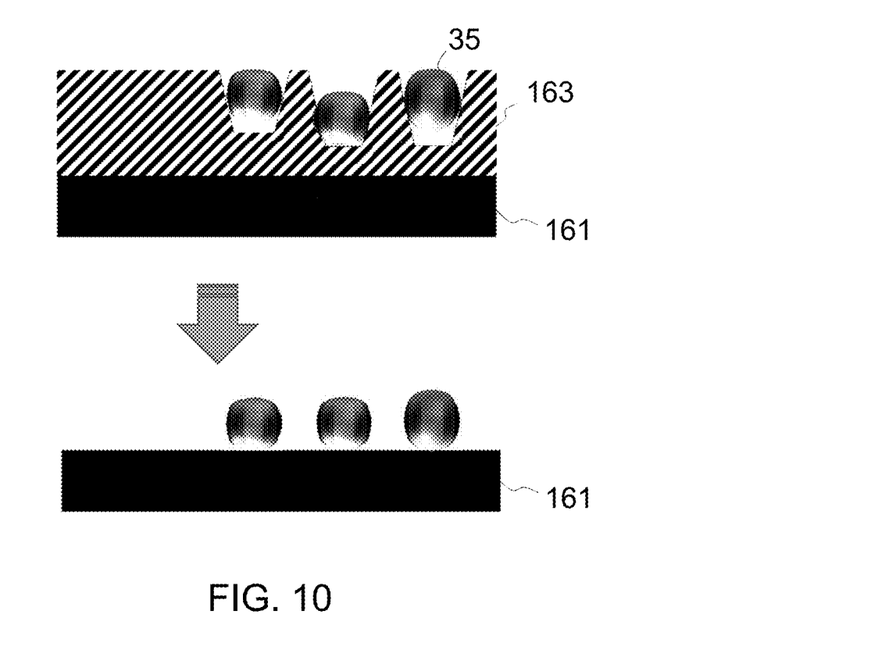
FIG. 10 illustrates a high-level fabrication operation of an optical probe according to one or more embodiments.

According to another aspect, the invention can be embodied as a method of fabrication of an optical sensor probe 16, as discussed now in reference to FIGS. 7-10. As illustrated in FIG. 7 or 9, present fabrication methods rely on a bilayer structure, i.e., a structure comprising a substrate 161 with a removable polymer 162, 163 thereon. The removable polymer may be structured, as illustrated in FIG. 7 or 9, to obtain a desired template for the assembly. The structured template may for instance exhibit indentations, grooves and/or cavities, meant to trap quantum dots to be subsequently deposited. Next, luminescent quantum dots 35 can be deposited on the top surface of the structured polymer (as illustrated in FIG. 8). To that aim, a colloidal dispersion of quantum dots may be used, whereby some of the quantum dots will deposit according to the template, e.g., in cavities, grooves or indentations, as illustrated in FIG. 8 or 10. Finally, the polymer is removed, as illustrated in FIG. 8 or 10, to obtain quantum dots precisely arranged on the substrate 161, in accordance with the template.

The deposition step may be repeated, if necessary, in order to deposit different kinds of quantum dots (different sizes/composition), using different colloidal solutions each time. In that respect, we note that the polymer template may be designed so as for distinct indentations thereon to trap distinct types of quantum dots. For example, different sizes of indentations can be provided to trap different sizes of quantum dots. Larger quantum dots need be deposited first. Additional molecules, or coating of the structured polymer, may be involved to trap quantum dots of distinct compositions.

Eventually, a probe 16, 16a can accordingly be obtained, either independently from a sample or directly thereon. In other words, the substrate 161 may be the sample 20 itself, or the substrate 161 may be a transparent layer meant to be laid on a movable stage, consistently with the two classes of embodiments discussed earlier.

The polymer may be structured using electron beam lithography (EBL) techniques, as assumed in FIGS. 7-8. The polymer may for instance be Polymethyl methacrylate, or PMMA.

In variants such as depicted in FIGS. 9-10, thermal scanning probe lithography can be used to pattern a temperature-sensitive polymer, such as polyphthalamide (PPA), with nanometer resolution.

The quantum dot assembly may be achieved in different ways, in particular using standard top-down or bottom-up approaches via atomic force microscopy 3. Template-assisted assembly methods ensure a precise determination of the relative distances among the quantum dots. In addition, an alternative to the top-down approaches is the possibility to assemble the quantum dots using bottom-up methods. Although assembly via bottom-up methods is expected to be more challenging, it may provide a more gentle and versatile approach towards achieving bright quantum dot nanoprobes. Two procedures can notably be contemplated. First, and as it was recently demonstrated, multi-component, tunable assemblies of quantum dots can be made with DNA as the bonding material. This strategy even proves successful for the assembly of quantum dots having different sizes. Although the resulting assemblies are quite fragile, this approach provides a versatile tool for clustering quantum dots with nanoscale separation. Second, wet-chemistry approaches are known for their capability to deliver a variety of nanocrystals with different sizes, shapes and compositions. Nanometer-level control has also enabled the formation of multi-component heterostructures. As an example, bright PbSe (or CdTe) quantum dots can be grown at the two ends of a CdS nanorod, serving as an anchor for the particles.

Therefore, the nanoscale assembly of the quantum dots can be achieved with existing methods of fabrication ensuring the desired accuracy.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For examples, the quantum dots may comprise other materials or elements than those explicitly cited here.

What is claimed is:

1. A method for fabrication of an optical sensor probe, the method comprising:
   providing a bilayer structure comprising a substrate with a removable polymer thereon;
   structuring the removable polymer to obtain a template;
   depositing quantum dots onto the template, the template being formed with indentations of different sizes to trap different sizes of the quantum dots; and
   removing the polymer to obtain the quantum dots arranged on the substrate, according to the template, so as to form the probe comprising subsets of arrangements of the quantum dots, wherein each of the subsets comprises at least two quantum dots of different sizes.

2. The method of claim 1, wherein the removable polymer comprises polymethyl methacrylate, the polymethyl methacrylate being structured using electron-beam lithography.

3. The method of claim 1, wherein the removable polymer is structured by atomic force microscopy, wherein each of the subsets comprises at least three quantum dots of different sizes.

4. The method of claim 1, further comprising mounting the probe in an apparatus.

5. The method of claim 4, wherein the apparatus comprises:
   a sample holder, designed to hold a sample, in operation;
   an optical source, configured to optically excite the quantum dots;
   an optical detector, configured to read optical signals from the quantum dots; and
   a circuit connected to the optical detector and configured to determine correlations between optical signals read by the optical detector.

6. The method of claim 5, wherein the quantum dots and the circuit are further configured to simultaneously sense electric, magnetic, and temperature properties of the sample based on the correlations determined.

7. The method of claim 5, wherein the circuit is further configured to locate positions of electric charges in the sample based on the correlations determined.

8. The method of claim 5, wherein:
   the apparatus further comprises the sample held in the sample holder; and
   the probe is formed on a surface of the sample.

9. The method of claim 5, wherein each of the subsets comprises at least three quantum dots of different sizes.

10. The method of claim 5, wherein the probe and the sample holder are mounted movable with respect to each other in the apparatus, such that the probe is movable with respect to the sample, when the sample is held in the sample holder, in operation.

11. The method of claim 5, wherein the probe is positionable at a distance less than 100 nm from the sample, when the latter is held in the sample holder, in operation.

12. The method of claim 5, wherein the probe is configured so as to be movable parallel to and above a surface of the sample, in operation, such that the quantum dots remains at a distance from said surface that is less than 100 nm.

13. The method of claim 1, wherein each of the subsets comprises at least two quantum dots of different sizes and different chemical compositions.

14. The method of claim 1, wherein each of the quantum dots comprises one or more of the following elements: Cd, S and Se.

15. The method of claim 1, wherein a first one of said quantum dots comprises CdSe, a second one of said quantum dots comprises CdS and a third one of said quantum dots comprises $CdS_xSe_{1-x}$, $x \in [0, 1]$.

16. The method of claim 1, wherein each of the quantum dots has a maximal dimension that is less than 15 nm.

17. The method of claim 1, wherein a minimal distance between any two of the quantum dots is between 1 nm and 50 nm.

18. The method of claim 1, wherein a minimal distance between any two of the quantum dots is between 6 and 15 nm.

* * * * *